(12) United States Patent
Wei et al.

(10) Patent No.: US 8,488,204 B2
(45) Date of Patent: Jul. 16, 2013

(54) DATA ENCRYPTION METHOD IMPLEMENTED ON A PATTERN DISPLAYING MEDIUM WITH AT LEAST TWO TYPES OF INK

(75) Inventors: Shou-Te Wei, Hsin-Chu Hsien (TW); Cho-Yi Lin, Hsin-Chu Hsien (TW); Yao-Ching Hsu, Hsin-Chu Hsien (TW)

(73) Assignee: PixArt Imaging Inc., Science-Based Industrial Park, Hsin-Chu Hsien (TW)

( * ) Notice: Subject to any disclaimer, the term of this patent is extended or adjusted under 35 U.S.C. 154(b) by 711 days.

(21) Appl. No.: 12/115,558

(22) Filed: May 6, 2008

(65) Prior Publication Data

US 2009/0323124 A1 Dec. 31, 2009

(30) Foreign Application Priority Data

Nov. 14, 2007 (TW) ................................ 96142996 A

(51) Int. Cl.
*H04N 1/40* (2006.01)
(52) U.S. Cl.
USPC . 358/3.28; 358/1.8; 358/426.03; 358/426.04; 358/539
(58) Field of Classification Search
USPC ......................................................... 358/3.28
See application file for complete search history.

(56) References Cited

U.S. PATENT DOCUMENTS

| | | | | |
|---|---|---|---|---|
| 5,525,798 A * | 6/1996 | Berson et al. | .................. | 250/271 |
| 6,119,943 A * | 9/2000 | Christy | .......................... | 235/468 |
| 6,356,363 B1 * | 3/2002 | Cooper et al. | ................. | 358/1.9 |
| 6,446,866 B1 * | 9/2002 | Tatsuta | .......................... | 235/454 |
| 6,874,639 B2 * | 4/2005 | Lawandy | ........................ | 209/3.3 |
| 6,937,959 B2 * | 8/2005 | Keyl et al. | ..................... | 702/159 |
| 2003/0133164 A1 | 7/2003 | Tsai | | |
| 2004/0081332 A1 * | 4/2004 | Tuttle et al. | ................... | 382/100 |
| 2004/0150859 A1 * | 8/2004 | Hayashi | ....................... | 358/3.28 |
| 2005/0052706 A1 * | 3/2005 | Nelson | .......................... | 358/3.28 |
| 2005/0068589 A1 * | 3/2005 | Inness et al. | ................. | 358/3.28 |
| 2005/0145703 A1 * | 7/2005 | Bryborn | ........................ | 235/494 |
| 2007/0115152 A1 * | 5/2007 | Bjorklund et al. | .............. | 341/51 |
| 2007/0138306 A1 * | 6/2007 | Obrea et al. | .................. | 235/494 |
| 2007/0273917 A1 * | 11/2007 | Encrenaz et al. | ............ | 358/1.15 |
| 2008/0192300 A1 * | 8/2008 | Kenji | ........................... | 358/3.29 |
| 2008/0316538 A1 * | 12/2008 | Saito | ............................ | 358/3.28 |
| 2009/0161957 A1 * | 6/2009 | Chan et al. | ..................... | 382/181 |
| 2009/0174910 A1 * | 7/2009 | Kuraki et al. | ................ | 358/3.28 |
| 2009/0177416 A1 * | 7/2009 | Nilsagard et al. | ............... | 702/41 |

FOREIGN PATENT DOCUMENTS

| TW | 417388 | 1/2001 |
|---|---|---|
| TW | 421964 | 2/2001 |

\* cited by examiner

*Primary Examiner* — Marivelisse Santiago Cordero
*Assistant Examiner* — Aaron R Gerger
(74) *Attorney, Agent, or Firm* — Winston Hsu; Scott Margo

(57) ABSTRACT

Various types of ink corresponding to non-overlapping wavelength domains in absorbing lights are utilized on a pattern displaying medium for marking coordinate dots and data dots of a plurality of data blocks. While a scanning device is utilized for scanning the pattern-displaying medium, the marked coordinate dots and data dots are precisely recognized and read. While the pattern displaying medium is to be marked, the coordinate dots are marked in advance, and then the data dots are marked according to the marked coordinate dots for preventing positioning errors. Besides, at least one locality dot is used in each data block. While the scanning device is utilized for scanning the pattern displaying medium, a reading direction of each data block is indicated by the at least one locality dot so as to precisely read dots of each data block.

22 Claims, 13 Drawing Sheets

DATA ENCRYPTION METHOD IMPLEMENTED ON A PATTERN DISPLAYING MEDIUM WITH AT LEAST TWO TYPES OF INK

BACKGROUND OF THE INVENTION

1. Field of the Invention

The present invention relates to a data encryption method, and more particularly, to a data encryption method implemented on a pattern displaying medium with at least two types of ink.

2. Description of the Prior Art

From ancient times, many languages have been represented with pictures or patterns for indicating respective meanings, such as Pictograph or other ancient languages. Therefore, various meaningful patterns, or even permutations and combinations of pictures and patterns, serve as foundations of transmitting messages. Under certain circumstances, a highly classified message has to be transmitted from a person A to another person B, and cannot be retrieved and realized by still another person C, who is other than both the people A and B. Such a condition may be fulfilled by using a technique called steganography for hiding information. Steganography is a technique of hiding meaningful messages within pictures, languages, or objects, is an ancient technique utilized for thousands of years, and is an effective technique of transmitting messages without letting the transmitted messages perceived by someone else, who needs not to know the transmitted messages. Besides purposes related to communication systems, steganography may also applied on characters and pictures, both of which are shown on surfaces of products and are utilized for hiding information from being perceived by consumers, so as to rapidly confirm product-related messages, which consumers need not to know.

For example, within bar codes utilized on a wide variety of products, no information is exposed to consumers. In other words, the bar codes do not bring any meaningful information for the consumers. However, for a product management who has a scanner for decrypting the bar codes, information hidden within the bar codes is meaningful so that a scanned product may be directly recognized. Braille may also be utilized on a toy, different parts of which are padded with encrypted patterns or characters. When the encrypted patterns or characters are scanned or triggered by specific commands, corresponding messages are decrypted or issued. However, the decrypted or issued messages are conventionally hidden in a visible manner for the naked eye. Moreover, a degree of hiding information is often restricted by patterns or colors adhered to the surface of the object. Therefore, an amount of hidden messages on the surface of the object is also strictly restricted.

Please refer to FIG. 1 and FIG. 2, which are diagrams of a disclosed method for indicating data by pointers indicated by patterns according to US Publication Patent No. 2003/0133164. As shown in FIG. 1, data are indicated with a plurality of data blocks 120 on a pattern displaying medium 110 in the disclosed method. Each data block 120 is utilized for indicating a different datum, and is located at a different coordinate on the pattern displaying medium 110. Note that marking a plurality of coordinates on the pattern displaying medium 110 includes setting an origin on the pattern displaying medium 110, and inducting positions relative to the set origin one by one with the aid of interpolation so that the territory of each data block 120 is not overlapped to generating errors in indicating data. As shown in FIG. 2, a data block 120 covers a header region 122 and a data region 124, which includes a plurality of data units 126. Each data unit 126 indicates different bits with two states. In other words, each data unit 126 is utilized for indicating a single binary bit. Therefore, when there are n-by-n data units 126 in a data region 124, the data region 124 is utilized for indicating a data string having n-by-n bits, where n is a positive integer. Data indicated in a header region 122 of each data block 120 is the same.

While data indicated on the pattern displaying medium 110 are to be read, a preset scanning device is utilized for scanning characteristics of any data block 120 on the pattern displaying medium 110. A header region 122 of a data block 120 is the first to be scanned so as to recognize a domain covered by the data block 120. Then a data region 124 of the data block 120 is scanned for recognizing an indicated bit of each data unit 126 within the scanned data region 124. Data on the pattern displaying medium 110 are marked with ink capable of reflecting visible lights, and are public to any observer of the pattern displaying medium 110. For the purpose of information hiding, existences or meaningful information of the data blocks 120 must be concealed from those who need not to know hidden meanings of indicated data on the data blocks 120 of the pattern displaying medium 110, and therefore, ink utilized on the header region 122 and the data region 124 of each data block 120 is capable of absorbing infrared, and is of a same type. Besides, decreasing an amount of marked data units 126 of each data region 124 may also be regarded as a preferable technique in concealing the existences of data blocks 120 from being perceived by observers. Under the abovementioned circumstances, when the method disclosed in FIG. 1 and FIG. 2 is utilized on conventional products, observers may merely perceive obvious characteristics, such as trademarks on surfaces of the products, other than the plurality of marked data blocks 120 so that information hiding is fulfilled.

However, there are two obvious defects in the method disclosed in FIG. 1 and FIG. 2. First, for preventing domains of the plurality of data blocks from being overlapped with each other, interpolation has to be utilized for locating each data block 120 with the aid of the predetermined origin. However, when marked coordinates on the pattern displaying medium 110 are not located at precise positions, the plurality of data blocks 120 are likely to be located at erroneous positions, where positioning errors of the marked coordinates may be generated by unpredicted vibrations or jitters of the pattern displaying medium 110. Second, when there are positioning errors in the indicated data within the plurality of data blocks 120, positioning errors of the coordinates inducted by interpolation are also significantly generated as a result of the domino effect. No matter which one of the discussed situation happens, positioning errors are inevitably generated in most data blocks 120 on the pattern displaying medium 110 so that the information hidden in the data blocks 120 cannot be precisely and completely read. Moreover, since a same type of ink for absorbing infrared is utilized for marking both the header region 122 and the data region 124 of each data block 120, while any one group among the marked coordinates and the data blocks has positioning errors, the other group must be brought with positioning errors as well. Therefore, the positioning errors are likely generated in the plurality of data blocks 120 on the pattern displaying medium 110, and even a yield of each product utilizing the pattern displaying medium 110 is significantly reduced.

SUMMARY OF THE INVENTION

The claimed invention discloses a data encryption method implemented on a pattern displaying medium with at least two types of ink. The disclosed method comprises marking a plurality of coordinate dots on the pattern displaying medium with a first type of ink, encrypting plaintext data into a plurality of data dots, and marking the plurality of data dots on the pattern displaying medium with a second type of ink according to positions of the plurality of marked coordinate dots. A wavelength domain of the first type of ink is not overlapped with a wavelength domain of the second type of ink in absorbing light spectrum.

These and other objectives of the present invention will no doubt become obvious to those of ordinary skill in the art after reading the following detailed description of the preferred embodiment that is illustrated in the various figures and drawings.

DETAILED DESCRIPTION

For overcoming the defects of the prior art and related to positioning errors, a data encryption method of using at least two types of ink for indicating data is disclosed in the present invention. In the disclosed data encryption method, a first type of ink is utilized for marking coordinate dots on the pattern displaying medium in advance, then data dots of each data block are marked with at least one second type of ink at relative positions of the coordinate dots, each corresponding coordinate dot serving as a center dot. Therefore, while the disclosed data encryption method of the present invention is utilized for scanning the pattern displaying medium for reading data (or retrieving information), the defects of the prior art may be effectively neutralized, and the marked data on the pattern displaying medium may be precisely read.

Figure 3:
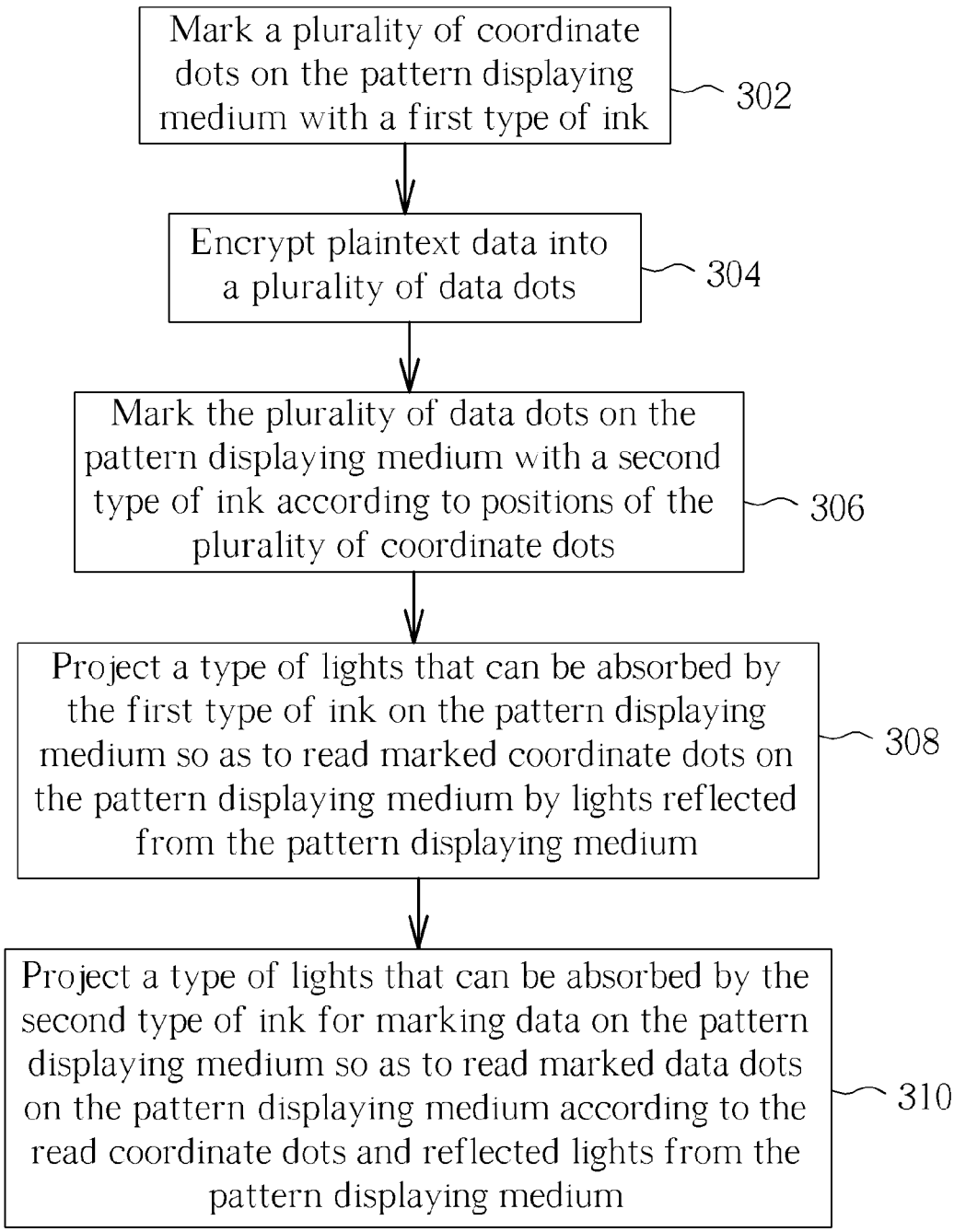
FIG. 3 is a flowchart of the data encryption method of the present invention.

Please refer to FIG. 3, which is a flowchart of the data encryption method of the present invention. As shown in FIG. 3, the data encryption method of the present invention includes steps as follows:

Step 302: Marking a plurality of coordinate dots on the pattern displaying medium with a first type of ink.

Step 304: Encrypting plaintext data into a plurality of data dots.

Step 306: Marking the plurality of data dots on the pattern displaying medium with a second type of ink according to positions of the plurality of coordinate dots.

Step 308: Projecting a type of lights that can be absorbed by the first type of ink on the pattern displaying medium so as to read marked coordinate dots on the pattern displaying medium by lights reflected from the pattern displaying medium.

Step 310: Projecting a type of lights that can be absorbed by the second type of ink for marking data on the pattern displaying medium so as to read marked data dots on the pattern displaying medium according to the read coordinate dots and reflected lights from the pattern displaying medium.

Figure 1:
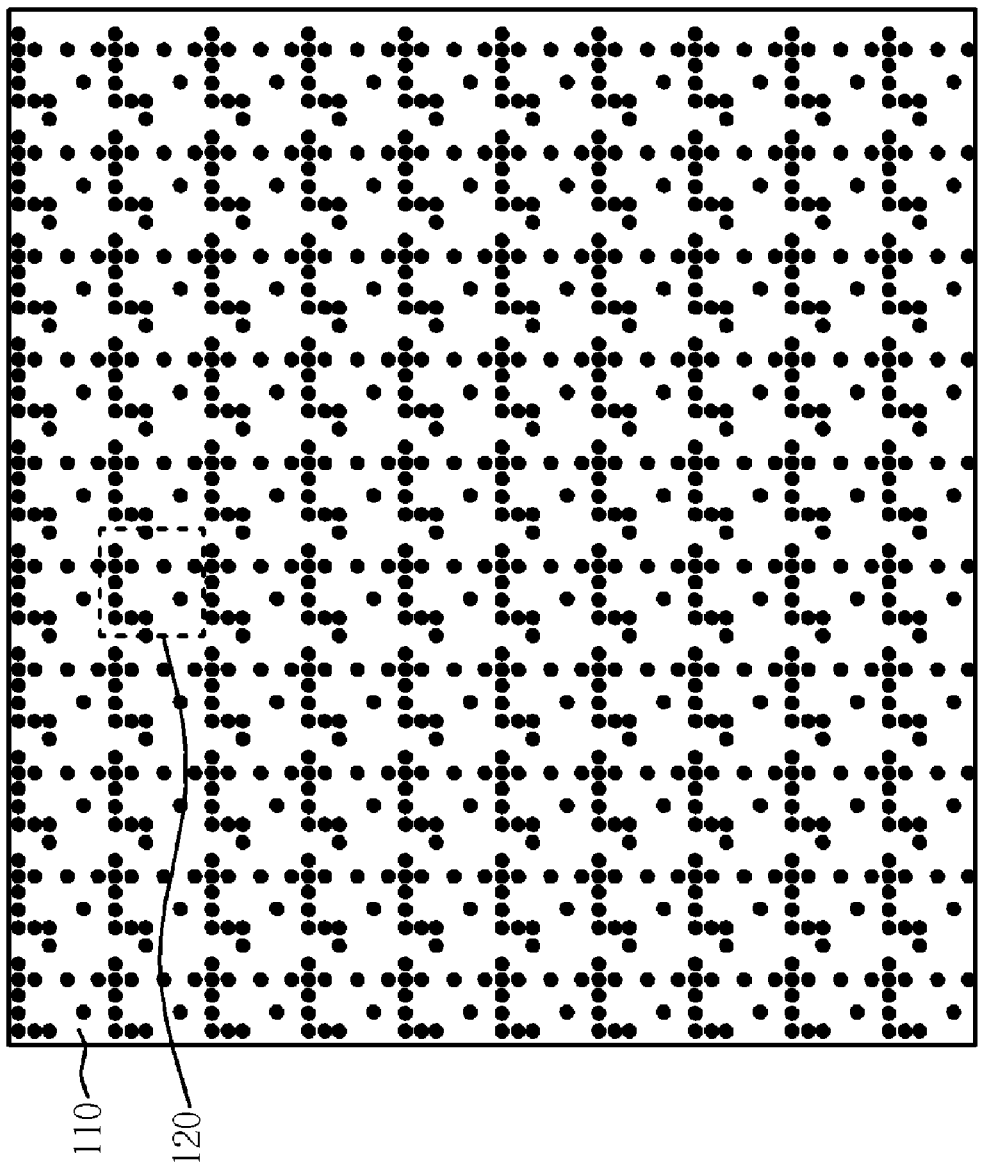
FIG. 1 and FIG. 2 are diagrams of a disclosed method for indicating data by pointers indicated by patterns according to US Publication Patent No. 2003/0133164.
Figure 2:
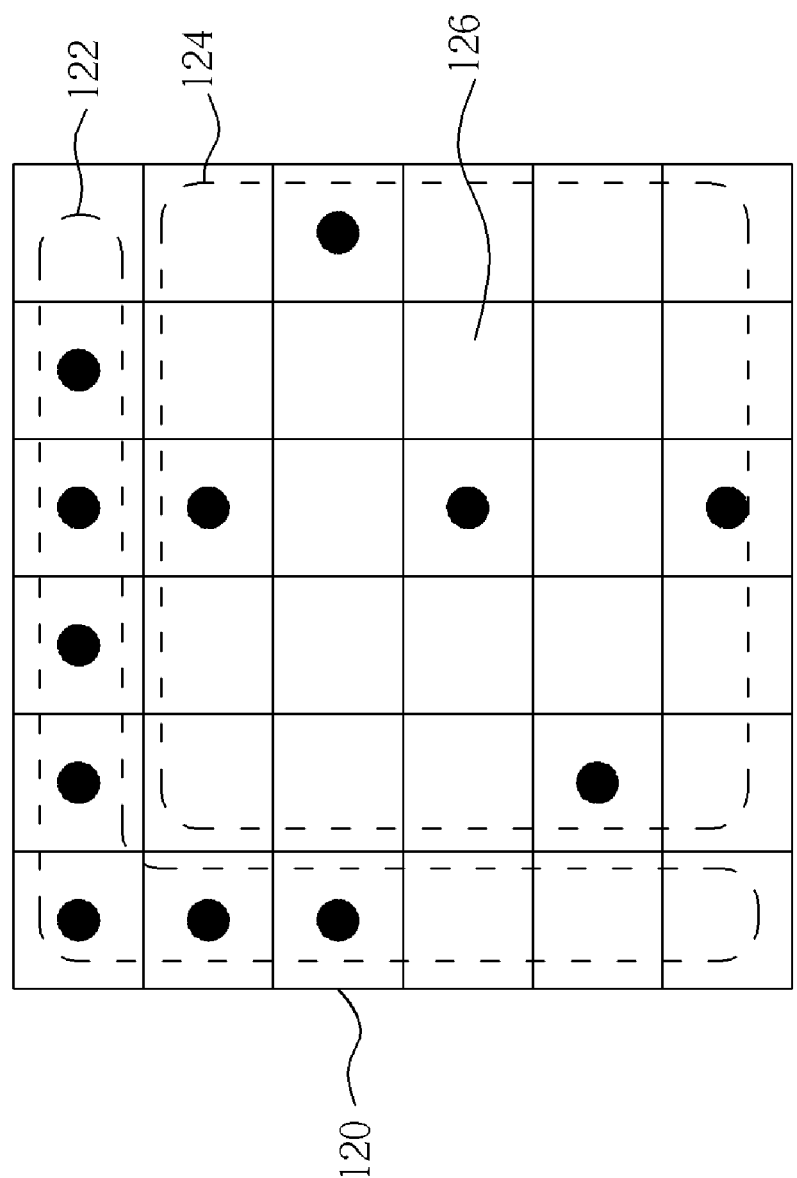
Figure 4:
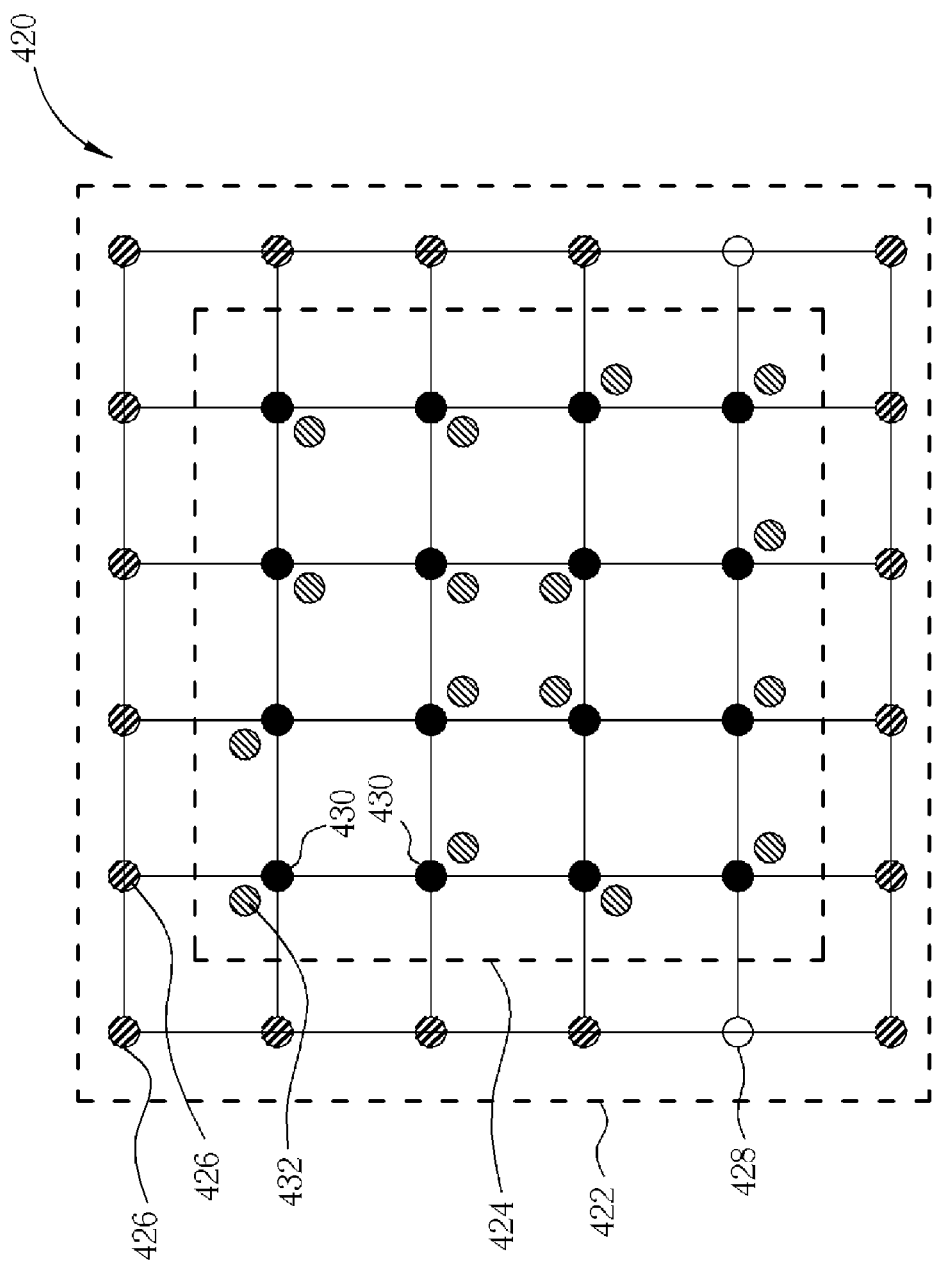
FIG. 4 is a diagram of a data block according to the data encryption method illustrated in FIG. 3 and a first embodiment of the present invention.

Please refer to FIG. 4, which is a diagram of a data block 420 according to the data encryption method illustrated in FIG. 3 and a first embodiment of the present invention. Note that the data block 420, which is the same with the data block 120 illustrated in FIG. 1, is disposed on a pattern displaying medium and is represented on a two-dimensional surface. Moreover, embodiments generated by replacing the data block 120 in FIG. 1 with data blocks, such as the data block 420, disclosed hereafter in the present invention should also be regarded as embodiments of the present invention. As shown in FIG. 4, the data block 420 covers a boundary region 422 and a data region 424. The boundary region 422 includes a plurality of boundary dots 426 and a plurality of locality dots 428. The data region 424 includes a plurality of positioning dots 430 and a plurality of data dots 432. Before running Step 302, a plurality of coordinate dots is defined on the pattern displaying medium at locations occupied by the boundary dots 426, the locality dots 428, and the positioning dots 430 on the data block 420. The plurality of boundary dots 426 on the boundary region 422 is utilized for indicating boundaries of the data block 420 so as to prevent said data block 420 from overlapping with other data blocks. The plurality of locality dots 428 on the boundary region 422 is disposed on the boundary region 422 for indicating locality so that the data block 420 may be precisely read by following the indicated locality. In other words, the plurality of locality dots 428 serve as beacons for indicating the locality of the data block 420 while said data block 420 is to be read. The plurality of positioning dots 430 of the data region 424 serve as benchmarks for disposing a plurality of corresponding data dots 432. As shown in FIG. 4, each data dot 432 is positioned around a corresponding positioning dot 430. Note that the grid lines illustrated in FIG. 4 are merely for describing relative positions of the coordinate dots, and are not marked with any types of ink for hiding information while the data encryption method of the present invention is physically utilized.

The data block 420 shown in FIG. 4 is then utilized for describing the steps of the data encryption method shown in FIG. 3. In Step 302, most coordinate dots within the data block 420 are first marked with a type of ink capable of absorbing invisible lights. In a preferred embodiment of the present invention, the type of ink is used for marking all boundary dots 426 and positioning dots 430 in the data block 420. For ensuring the locality indicated by the locality dots 428 with the scanning device while the data block 420 is read, note that in a preferred embodiment of the present invention, the locality dots 428 are not marked with any types of ink. In another preferred embodiment of the present invention, the locality dots 428 are marked with another type of ink capable absorbing invisible lights, and moreover, when the scanning device is utilized for scanning the pattern displaying medium, a type of lights capable of absorbing the type of ink utilized for marking the locality dots 428 is first utilized by the scanning device so as to confirm a direction of reading data indicated by the locality dots 428 in advance. Note that in the preferred embodiment, a wavelength domain of the type of invisible lights for marking the localities dots 428 is not overlapped with a wavelength domain of the type of invisible lights for marking both the boundary dots 426 and the positioning dots 430 so as to clearly distinguish the locality dots 428 from both the boundary dots 426 and the positioning dots 430.

Figure 5:
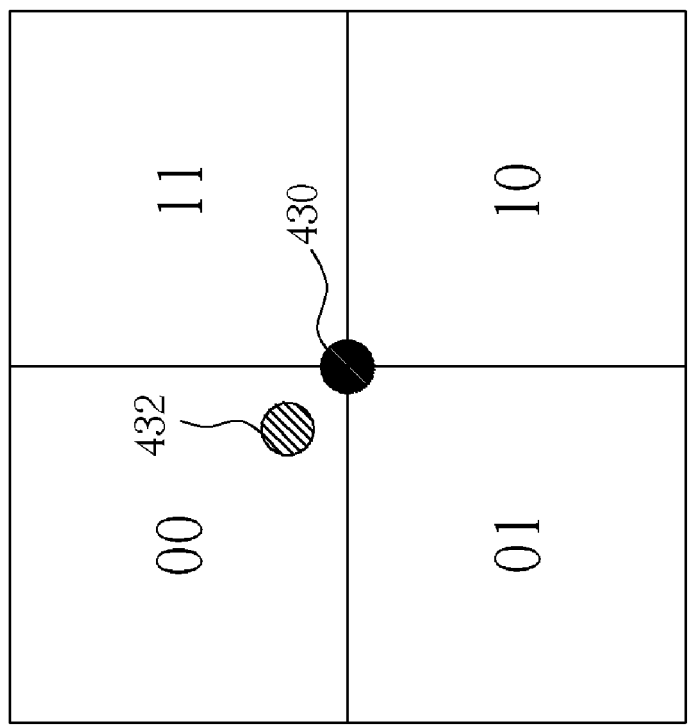
FIG. 5 is a diagram for illustrating how a data dot is marked around a corresponding positioning dot in an encrypting manner according to the diagram shown in FIG. 4.

Please refer to FIG. 5, which is a diagram for illustrating how a data dot 432 is marked around a corresponding positioning dot 430 in an encrypting manner according to the diagram shown in FIG. 4. In Step 304 and 306, the data dot 432 may be placed at different relative positions of the positioning dot 430 for indicating data having different contents. As shown in FIG. 5, four quadrants around the positioning dot 430 are utilized for implementing encryption of a two-bit character string, where the first quadrant indicates the two-bit character string "11", the second quadrant indicates the two-bit character string "00", the third quadrant indicates the two-bit character string "01", and the fourth quadrant indicates the two-bit character string "10". For example, the data dot 432 shown in FIG. 5 is positioned at the second quadrant relative to the positioning dot 430 so that said data dot 432 indicates the two-bit character string "00". In a preferred embodiment of the present invention, the type of ink for marking the data dots 432 absorbs invisible lights, and a wavelength domain of the type of invisible lights capable of absorbing said type of ink is not overlapped with wavelength domains of invisible lights capable of absorbing the types of ink for marking the coordinate dots including the boundary dots 426, the locality dots 428, and the positioning dots 430, so that the data dots 432 may be distinguished from the other coordinate dots while the data block 432 is read. Note that the abovementioned two-bit character strings indicated by the quadrants merely indicate an embodiment of the present invention, and permuting the correspondences between the quadrants and the two-bit character strings should not be limitations to the present invention.

Note that when a same type of ink is utilized for marking both the boundary dots 426 and the positioning dots 430 in Step 302, existences of the data dots 432 may be foundations of distinguishing the boundary dots 426 from the positioning dots 430. In other words, when a scanned coordinate dot is not marked with any data dot 432 around, the scanned coordinate dot must be a boundary dot 426, or otherwise be a positioning dot 430.

In Step 308, the type that can absorb the type of ink utilized in Step 302 is used for irradiating the pattern displaying medium. Since the type of invisible lights is absorbed at positions of the coordinate dots, said type of invisible lights is reflected at other positions on the data block. In other words, as long as the scanning device is set to detect positions where the type of invisible lights is not reflected, all positions occupied by the coordinate dots may be effectively recognized. The recognized positions of the coordinate dots may then be stored at built-in firmware of the scanning device or at other types of memory devices. In Step 310, a type of lights capable of absorbing the type of ink utilized in Step 306 is utilized for irradiating the pattern displaying medium. Similarly, as long as the scanning device is set to detect positions where the type of invisible lights utilized in Step 310 is reflected, all positions occupied by the data dots 432 may be effectively recognized. Note that when a same type of ink is utilized for marking both the boundary dots 426 and the positioning dots 430, as mentioned above, stored positions of the data dots 432 may be utilized for distinguishing the boundary dots 426 from the positioning dots 430. After both Step 308 and Step 310 are completed, positions of all coordinate dots and all data dots 432 are recognized, information hidden in each data dot 432 may thus be retrieved by the relative position between the positioning dot 430 and the data dot 432.

In one embodiment of the present invention, the type of ink for marking the coordinate dots is capable of absorbing infrared rays, and the type of ink for marking the data dots 432 is capable of absorbing ultraviolet rays. A corresponding scanning device is equipped with a plurality types of lights for radiating infrared rays and ultraviolet rays, and is equipped with a corresponding plurality of detectors for detecting the infrared rays and the ultraviolet rays as well. In another embodiment of the present invention, the type of ink for marking both the boundary dots 426 and the positioning dots 430 is capable of absorbing infrared rays, the type of ink for marking the locality dots 428 is capable of absorbing far infrared rays, and the type of ink for marking the data dots 432 is capable of absorbing ultraviolet rays. Note that using different types of ink for marking different kinds of dots, or marking the locality dots 428 with or without any type of ink, should be still regarded as simple or reasonable combinations of embodiments of the present invention.

According embodiments of the present invention, at least one locality dot 428 is marked at a same position of all data blocks 420 on a same pattern displaying medium. As shown in FIG. 4, since relative positions between a plurality of locality dots 428 in a same data block 420 are fixed, and since relative positions between locality dots 428 of different data blocks 420 must be inconsistent, the existence of the plurality of locality dots 428 in the same data block 420 ensures the locality of said same data block 420. With the aid of the locality of each data block 420 provided by a corresponding plurality of locality dots 428, while the pattern displaying medium is scanned in arbitrary directions, the scanning device is capable of recognizing precise directions for reading each data block 420 without missing characteristics of each data block 420.

Figure 6:
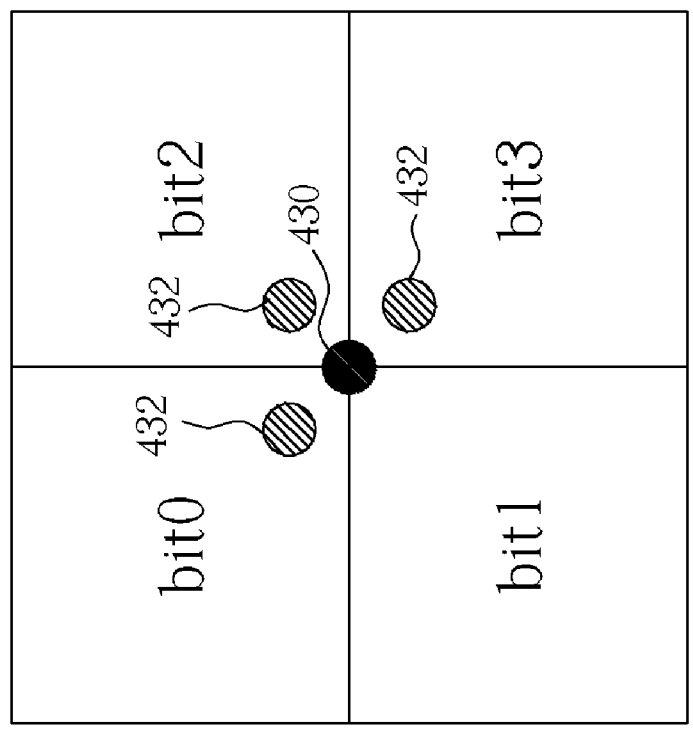
FIG. 6 is a diagram of adopting four-bit encryption according to quadrants defined by both the data dots and the positioning dots shown in FIG. 4.
Figure 7:
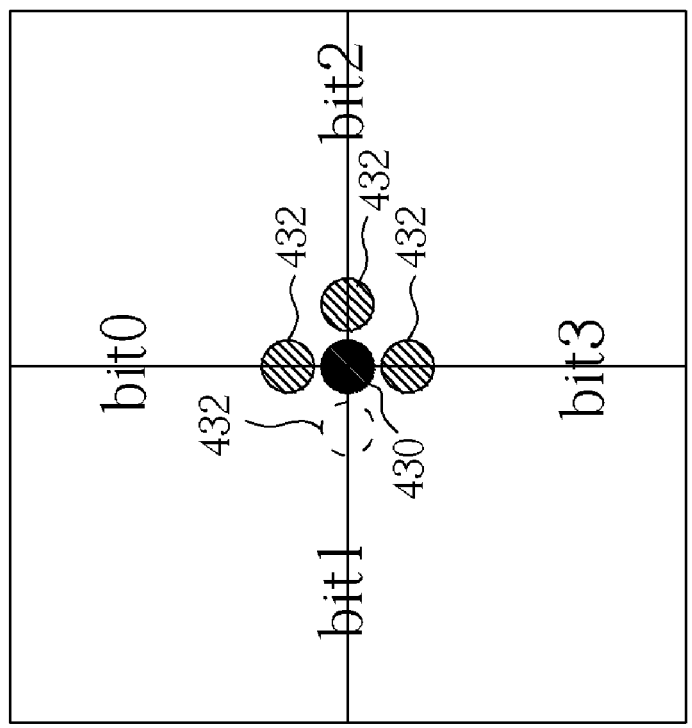
FIG. 7 is a diagram of adopting four-bit encryption according to coordinate axes defined by both the data dots and the positioning dots shown in FIG. 4.
Figure 8:
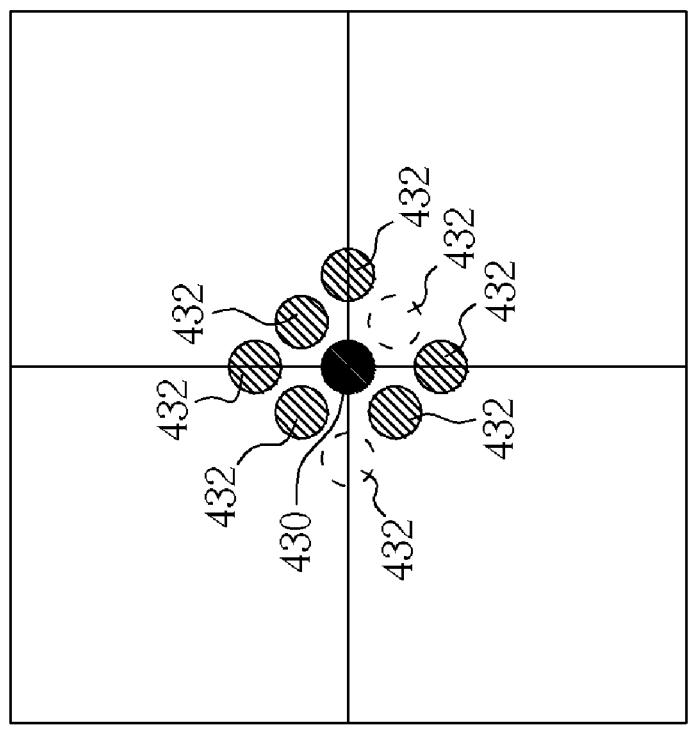
FIG. 8 is a diagram of adopting 8-bit encryption according to quadrants defined by both the data dots and the positioning dots shown in FIG. 4.

The data encryption method disclosed in the present invention is not limited to the binary encryption method illustrated in FIG. 5 and inducted from different quadrants, and the number of encrypted bits is not limited to 2 as well. Please refer to FIG. 6, which is a diagram of adopting 4-bit encryption according to quadrants defined by both the data dots 432 and the positioning dots 430 shown in FIG. 4. As shown in FIG. 6, the four quadrant centered at the positioning dot 430 indicate different bits respectively for indicating a four-bit character string, where the first quadrant indicates a third bit bit2 of the four-bit character string, the second quadrant indicates a first bit bit0 of the four-bit character string, the third quadrant indicates a second bit bit1 of the four-bit character string, and the fourth quadrant indicates a fourth bit bit3 of the four-bit character string. In the bit encryption illustrated in FIG. 6, which one among a bit 0 or a bit 1 is indicated by a quadrant is determined by the presence of the data dot 432 at the quadrant. When the data dot 432 is absent at the quadrant, the bit 0 is indicated by the quadrant. When the data dot 432 is present at the quadrant, the bit 1 is indicated by the quadrant. As can thus be inducted, a value of the four-bit character string illustrated in FIG. 6 is "1011". Note that permuting correspondences between quadrants and bits or changing the definitions of the indicated bit of any quadrant should not be limitations to the present invention. Please refer to FIG. 7, which is a diagram of adopting 4-bit encryption according to coordinate axes defined by both the data dots 432 and the positioning dots 430 shown in FIG. 4. In FIG. 7, the coordinate axis between the first quadrant and the second quadrant indicates a first bit bit0 of a four-bit character string, the coordinate axis between the second quadrant and the third quadrant indicates a second bit bit1 of the four-bit character string, the coordinate axis between the third quadrant and the fourth quadrant indicates a third bit bit2 of the four-bit character string, and the coordinate axis between the fourth quadrant and the first quadrant indicates a fourth bit bit3 of the four-bit character string. As can thus be inducted, a value of the four-bit character string illustrated in FIG. 7 is "1011". Note that permuting correspondences between the coordinate axes and the indicated bit, or changing the definition of the indicated bit related to the presence of the data dot 432, should not be limitations of the present invention. Please refer to FIG. 8, which is a diagram of adopting 8-bit encryption according to quadrants defined by both the data dots 432 and the positioning dots 430 shown in FIG. 4. In FIG. 8, a positioning dot 430 is surrounded by eight data dots 432 for indicating an eight-bit character string. When the data dot 432 placed on the coordinate axis between the first quadrant and the fourth quadrant indicates a first bit bit0 of the eight-bit character string, and when the bits of the eight-bit character string are assumed to be placed around the surrounded positioning dot 430 in a counterclockwise order, a value of the eight-bit character string is "1111 0110", as shown in FIG. 8. As can be observed in the above diagrams, the encryption techniques disclosed herein may be inducted to encrypt character strings having more bits so that the inducted encryption techniques should not be limitations to the present invention.

Figure 9:
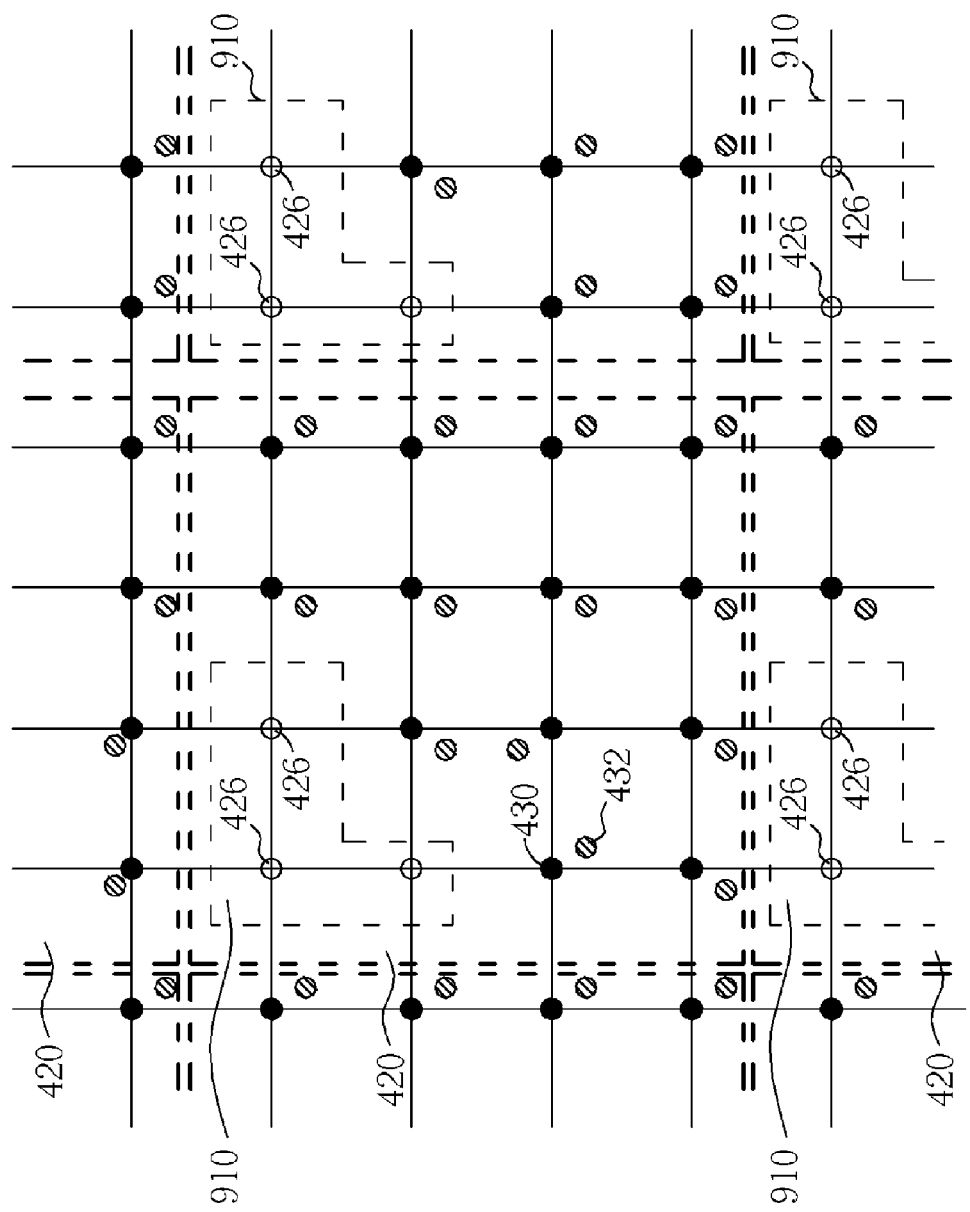
FIG. 9 is a diagram of taking part of the boundary dots in a data block shown in FIG. 4 as a header carrying predetermined characteristics.

In FIG. 4, though data dots 432 are placed around the positioning dots 430 for distinguishing the boundary dots 426, the locality dots 428, and the positioning dots 430 with each other, in still other embodiments of the present invention, the locality indicated by the locality dots 428 may also be indicated with specific representations of the boundary dots 426 so as to facilitate the scanning device in recognizing the data blocks 420 without applying the locality dots 428. Please refer to FIG. 9, which is a diagram of taking part of the boundary dots 426 in a data block 420 shown in FIG. 4 as a header carrying predetermined characteristics. In FIG. 9, a plurality of boundary 426 of each data block 420 is marked with hallow dots, i.e., the plurality of boundary dots 426 is not marked with any types of ink. Therefore, characteristics indicated by the plurality of boundary dots 426 in each dotted-line region 910 shown in FIG. 9 are the same. In other words, the dotted-line region 910 may directly serve as a header of a corresponding data block 420 so as to facilitate the scanning device in recognizing the data block 420. Besides, with the aid of each L-shaped header indicated by each dotted-line region 910, boundaries of each data block 420 may be easily recognized by the scanning device. Therefore, the boundary dots 426 outside the dotted-line region 910 of the corresponding data block 420 may be directly replaced with positioning dots 430, and related data dots 432 may also be attached around the positioning dots 430 for indicating data. In other words, with the aid of such a technique, except for that the data blocks 420 recognized by the scanning device are ensured to not be overlapped with each other, additional data dots 432 are added around boundary dots 426, which originally have no data dots 432 around, so as to increasing an amount of indicated data of a single data block 420. In still another embodiment of the present invention, the boundary dots 426 covered by the dotted-line region 910 may also be marked with a type of ink, a wavelength domain of a type of lights may be absorbed by which is not overlapped with other wavelength domains corresponding to the types of ink on the pattern displaying medium, without leaving the boundary dots 426 as hallow dots. In other words, in this embodiment, a wavelength domain corresponding to the type of ink for marking the boundary dots 426 covered by the dotted-region 910 is not overlapped with wavelength domains corresponding to the types of ink for marking the data dots 432 or the boundary dots 426 outside the dotted-region 910.

Figure 10:
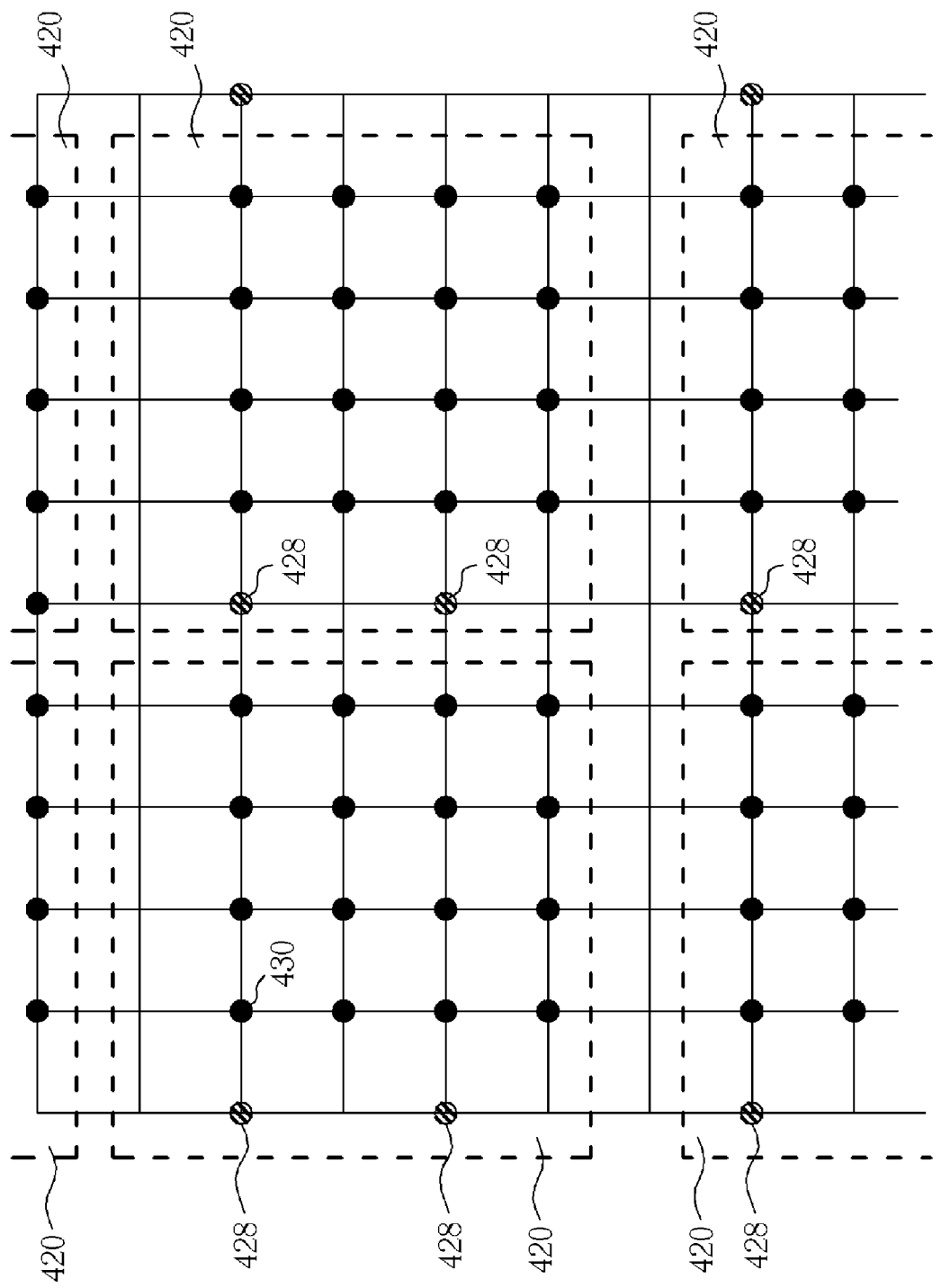
FIG. 10 is diagram of not marking the boundary dots of the data blocks shown in FIG. 4 with any types of ink.

Please refer to FIG. 10, which is a diagram of without marking the boundary dots 426 of the data blocks 420 shown in FIG. 4 with any types of ink. As shown in FIG. 10, the plurality of boundary dots 426 previously marked with the type of ink capable of absorbing invisible lights in FIG. 4 is not marked with any types of ink currently, and merely the locality dots 428 are marked for indicating the reading direction of the data block 420. Therefore, ink for marking the boundary dots 426 is saved, and the purpose of information hiding is better achieved by preventing marking the boundary dots 426 in an over-concentrated manner. Note that the markings of the locality dots 428 are not restricted as shown in FIG. 10 as long as the data block 420 can be clearly recognized by the scanning device. Therefore, even merely one locality dot 428 is marked within each data block 420, as long as a correct reading direction of each data block 420 can be indicated, such adaptations should also be regarded as embodiments of the present invention.

Figure 11:
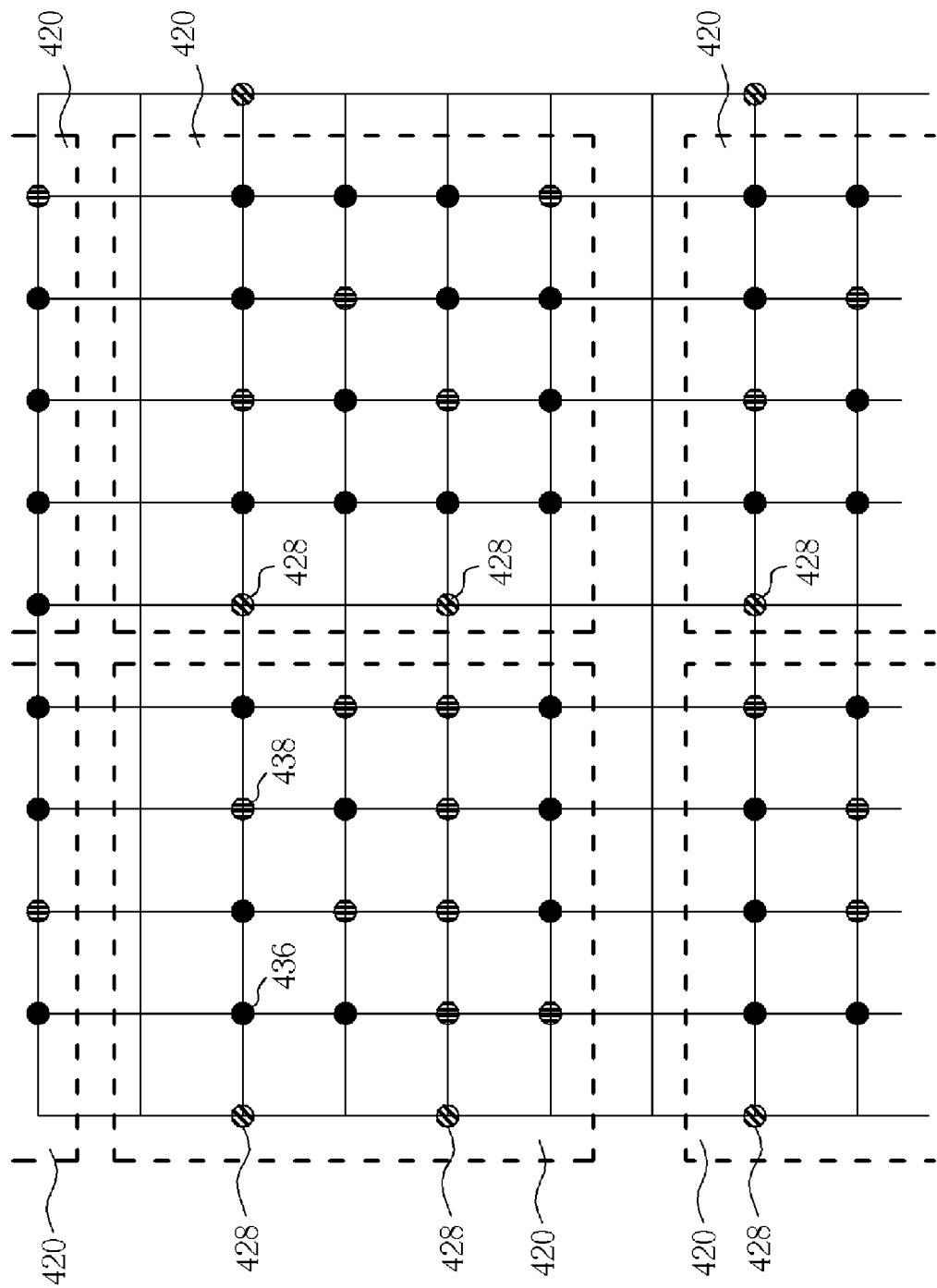
FIG. 11 is a diagram of an inducted embodiment of marking the locality dots with a plurality types of ink from the embodiment shown in FIG. 10.

Please refer to FIG. 11, which is a diagram of an inducted embodiment of marking the locality dots 430 with a plurality types of ink from the embodiment shown in FIG. 10. Compared to FIG. 10, and as can be observed from FIG. 11, the positioning dots 430 shown in FIG. 10 are replaced with a plurality of first positioning data dots 436 and a plurality of second positioning data dots 438 so as to have the positioning dots 430 to directly indicate data. Note that a wavelength domain corresponding to the type of ink for marking the plurality of first positioning data dots 436 is not overlapped with a wavelength domain corresponding to the type of ink for marking the plurality of second positioning data dots 438. In a preferred embodiment of the present invention, a first positioning data dot 436 indicates a bit 0, whereas the second positioning data dot 438 indicates a bit 1. When a latter-disclosed scanning device of the present invention is utilized for reading information hidden in the data blocks 420 shown in FIG. 1, using two types of lights, which may be absorbed by both the types of ink for respectively marking the plurality of first positioning data dots 436 and the plurality of second positioning data dots 438, in turn or simultaneously may help in clear reading of the hidden information. Note that though in the embodiment shown in FIG. 1, merely two types of lights having non-overlapped wavelength domains are used for marking the positioning data dots in the data block 420, in still other embodiments of the present invention, at least three types of lights having non-overlapped wavelength domains may also be utilized for marking the positioning data dots in the data block 420 to indicate character strings (or data) having more bits in size and broader ranges in value. Note that in the current embodiment, the marked positioning dots may still be marked with at least two other types of ink, where corresponding wavelength domains of the at least two other types of ink are not overlapped with each other nor with a wavelength domain corresponding to the first type of ink.

Figure 12:
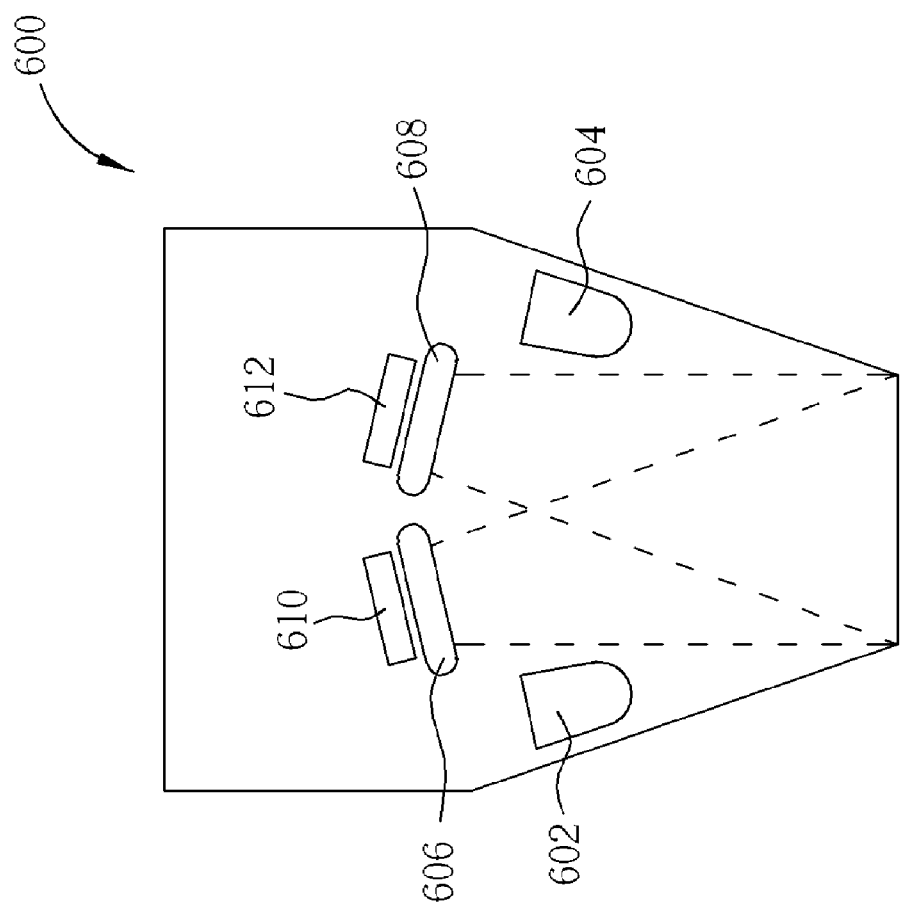
FIG. 12 is a schematic diagram of a scanning device utilized in the abovementioned embodiments of the present invention.

Please refer to FIG. 12, which is a schematic diagram of a scanning device 600 utilized in the abovementioned embodiments of the present invention. The scanning device 600 includes a first light emitting diode 602, a second light emitting diode 604, a first filter 606, a second filter 608, a first sensor 610, and a second sensor 612. The first light emitting diode 602, the first filter 606, and the first sensor 610 may be supposed to be applied by a first light source, whereas the second light emitting diode 604, the second filter 608, and the second sensor 612 may be supposed to be applied by a second light source. A wavelength domain of the first light source is not overlapped with a wavelength domain of the second light source. While the scanning device 600 is used in the abovementioned embodiments of the present invention, lights radiated from the first light emitting diode 602 are absorbed by the marked dots of the first type of ink on the pattern displaying medium, and corresponding lights are reflected from the pattern displaying medium so as to pass the first filter 606 and to be sensed by the first sensor 610. Similarly, lights radiated from the second light emitting diode 604 are absorbed by the marked dots of the first type of ink on the pattern displaying medium, and corresponding reflected lights are generated from the pattern displaying medium so as to pass the second filter 608 and to be sensed by the second sensor 612. At last, both the first sensor 610 and the second sensor 612 decrypt information hidden in the reflected lights. Note that the scanning device 600 illustrated in FIG. 12 is preferable for the condition that a distance between the scanning device and the scanned pattern displaying medium is much shorter, because the reflected lights are easier to be focused on each filter.

Figure 13:
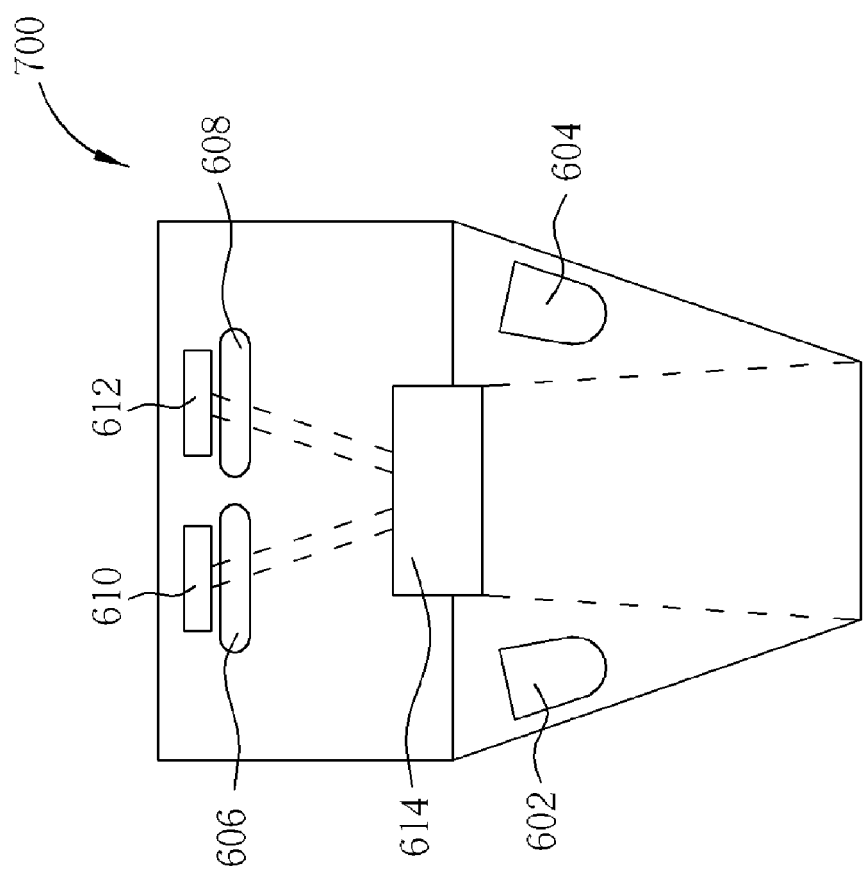
FIG. 13 is a schematic diagram of a scanning device generated by equipping a light splitter on the scanning device shown in FIG. 12.

Please refer to FIG. 13, which is a schematic diagram of a scanning device 700 generated by equipping a light splitter 614 on the scanning device 600 shown in FIG. 12. As shown in FIG. 13, after the light splitter 614 is equipped, the reflected lights are much easier to be focused on each filter. In other words, compared to the scanning device 600 illustrated in FIG. 12, the scanning device 700 is preferable for the condition that the distance between the scanning device and the scanned pattern displaying medium is much longer.

Note that in the embodiments of the present invention, while infrared rays and ultraviolet rays respectively serve as the first light source and the second light source having non-overlapped wavelength domains, both the light emitting diodes shown in FIG. 12 and FIG. 13 may be an infrared light emitting diode and a ultraviolet light emitting diode as well.

Note that for preventing positioning errors in reading the data blocks 420 from being generated by arbitrary vibrations and jitters of the pattern displaying medium, while the utilized scanning device switches invisible light sources having non-overlapped wavelength domains, a time interval for switching two types of invisible lights is set to be short enough so that the positioning of the scanning device on the pattern displaying medium is guaranteed to be safe and sound, for example, a couple of milliseconds. However, when the scanning device disclosed in FIG. 12 and FIG. 13 is utilized in the abovementioned embodiments of the present invention, a plurality of light sources having non-overlapped wavelength domains may still be simultaneously or non-simultaneously projected on the pattern displaying medium for retrieving information, where it indicates a similar situation of the time interval, which is a couple of milliseconds in length, in switching the light sources.

In the abovementioned embodiments of the present invention, though merely types of ink capable of absorbing invisible lights are used for marking, as long as the use of said types of ink is sparse enough on the pattern displaying medium for reaching information hiding so that observers cannot be aware of the existence of the used types of ink by the naked eye, types of ink capable of absorbing visible lights may still be used in the abovementioned embodiments of the present invention.

In the abovementioned embodiments of the present invention, though merely one type of ink is used for marking all coordinate dots, as long as capabilities of the scanning device are qualified, the boundary dots 426, the locality dots 428, and the positioning dots 430 may be respectively marked with different types of ink corresponding to non-overlapped wavelength domains in absorbing lights. Besides, a same type of dots of different data blocks may also be marked with different types of ink corresponding to non-overlapped wavelength domain in absorbing lights, as long as the scanning device is capable of recognizing the different marked dots.

Materials of the pattern displaying medium used in the present invention may include papers for printing patterns. However, using other types of materials for the pattern displaying medium should not be limitations to the present invention.

The present invention discloses a data encryption method. In the data encryption method, at least two types of ink are utilized for marking different types of dots of a plurality of data blocks on a pattern displaying medium. With light sources corresponding to the used types of ink on a scanning device, information or data hidden in the plurality of data blocks may be read or retrieved. In the data encryption method of the present invention, positions of coordinate dots on the pattern displaying medium are recorded in advance, then related data dots are marked on the pattern displaying medium according to the recorded positions of the coordinate dots. In other words, datum points of the marked data dots are set and marked in advance, and then the data dots are marked according to the set datum points. Compared to the technique of the prior art of approximating positions of coordinate dots and data dots with interpolations, the method of the present invention preferably prevents a significant amount of positioning errors from being generated so that encrypted data or information on data blocks of the pattern displaying medium is ensured to be precisely retrieved or read.

Those skilled in the art will readily observe that numerous modifications and alterations of the device and method may be made while retaining the teachings of the invention.

What is claimed is:

1. A data encryption method implemented on a pattern displaying medium with at least two types of ink comprising:
marking a plurality of coordinate dots on the pattern displaying medium with a first type of ink, comprising marking the plurality of coordinate dots with the first type of ink on a two-dimensional surface of the pattern displaying medium by taking part of the plurality of coordinate dots as a header of a data block so as to indicate boundaries or locality of the data block, wherein any one of the taken part of the plurality of coordinate dots is not marked with a related data dot around, and each coordinate, which is other than any one of the taken part of the plurality of coordinate dots, in the data block is marked with a related data dot around, the first type of ink absorbing a first invisible light;
encrypting plaintext data into a plurality of data dots, wherein the plurality of data dots are not used as part of a dot matrix for physically forming one or more alphanumeric characters with the data dots; and
marking the plurality of data dots on the pattern displaying medium with a second type of ink according to positions of the plurality of marked coordinate dots, wherein the first type of ink is not used for marking the plurality of data dots on the pattern displaying medium and the second type of ink absorbing a second invisible light;

wherein the first invisible light is different from the second invisible light;

wherein when the pattern displaying medium is illuminated by the first invisible light, the first invisible light is reflected from the pattern displaying medium, the first invisible light is sensed by a first invisible light image sensor, and the coordinate dots absorbing the first invisible light are sensed by the first invisible light image sensor, and when the pattern displaying medium is illuminated by the second invisible light, the second invisible light is reflected from the pattern displaying medium, the second invisible light is sensed by a second invisible light image sensor, and the data dots absorbing the second invisible light are sensed by the second invisible light image sensor.

2. The method of claim 1 wherein marking the plurality of coordinate dots with the first type of ink on the two-dimensional surface of the pattern displaying medium comprises:
preserving a plurality of unmarked coordinate dots on the two-dimensional surface so as to indicate locality of the two-dimensional surface.

3. The method of claim 1 further comprising:
marking a plurality of coordinate dots for indicating locality with a third type of ink on the two-dimensional surface of the pattern displaying medium;
wherein wavelength domains of the first, the second, and the third types of ink in absorbing light spectrum are not overlapped with each other.

4. The method of claim 3 wherein one type from the first, the second, and the third types of ink is capable of absorbing infrared rays, ultraviolet rays, or far infrared rays.

5. The method of claim 3 wherein at least one type from the first, the second, and the third types of ink is capable of absorbing invisible lights or visible lights.

6. The method of claim 1 wherein one type from the first and the second types of ink is capable of absorbing infrared rays, ultraviolet rays, or far infrared rays.

7. The method of claim 1 wherein the pattern displaying medium is made from paper or other media capable of adhering to ink.

8. The method of claim 1 further comprising:
projecting two types of lights simultaneously or non-simultaneously on the pattern displaying medium for receiving reflected lights from the pattern displaying medium so as to read the marked coordinate dots and data dots on the pattern displaying medium;
wherein the two types of lights correspond to the light spectrums absorbed by the first and the second types of ink respectively.

9. The method of claim 8 wherein projecting the two type of lights simultaneously or non-simultaneously on the pattern displaying medium for receiving the reflected lights from the pattern displaying medium so as to read the marked coordinate dots and data dots on the pattern displaying medium comprises:
projecting a type of light that can be absorbed by the first type of ink on the pattern displaying medium so as to read the marked coordinate dots on the pattern displaying medium according to lights reflected from the pattern displaying medium; and
projecting the type of light that can be absorbed by the type of ink for marking the data dots on the pattern displaying medium so as to read the marked data dots on the pattern displaying medium according to both the read coordinate dots on the pattern displaying medium and the reflected lights from the pattern displaying medium.

10. The method of claim 9 wherein when both the types of lights are utilized for projecting on the pattern displaying medium non-simultaneously so as to read the coordinate dots and the data dots, a time interval between both the types of lights utilized for projecting being short enough so that positioning errors are prevented during arbitrary jitters of the pattern displaying medium while a coordinate dot and a related data dot are read in turn.

11. The method of claim 1 wherein marking the plurality of data dots on the pattern displaying medium with the second type of ink according to positions of the plurality of marked coordinate dots comprising:
representing a character string having a plurality of bits in size with the aid of the plurality of data dots.

12. The method of claim 1 wherein marking the plurality of data dots on the pattern displaying medium with the second type of ink according to positions of the plurality of marked coordinate dots comprises:
indicating the plurality of data dots with quadrants corresponding to the plurality of coordinate dots.

13. The method of claim 1 wherein marking the plurality of data dots on the pattern displaying medium with the second type of ink according to positions of the plurality of marked coordinate dots comprises:
indicating the plurality of data dots with axes corresponding to the plurality of coordinate dots.

14. The method of claim 1 wherein marking the plurality of data dots on the pattern displaying medium with the second type of ink according to positions of the plurality of marked coordinate dots comprises:
indicating the plurality of data dots with axes and quadrants corresponding to the plurality of coordinate dots.

15. The method of claim 1 wherein marking the plurality of coordinate dots with the first type of ink on the two-dimensional surface of the pattern displaying medium comprises:
preserving a plurality of unmarked coordinate dots for indicating boundaries surrounding a plurality of data blocks on the two-dimensional surface.

16. The method of claim 5 wherein when the type of ink capable of absorbing visible lights is utilized for marking the plurality of coordinate dots, a distribution of the plurality of coordinate dots is sparse enough so that the plurality of coordinate dots is not easily distinguished by the naked eye.

17. The method of claim 1 further comprising:
preserving a plurality of coordinate dots for indicating boundaries of a data block;
correlating the plurality of data dots with positions of the plurality of preserved coordinate dots one by one; and
marking the plurality of data dots on the pattern displaying medium with the second type of ink and at least one third type of ink;
wherein each data dot is merely marked with one type among the second type of ink and the at least one third type of ink;
wherein a wavelength domain of the second type of ink is not overlapped with a wavelength domain of any one type among the at least one third type of ink in absorbing light spectrum, and a wavelength domain of each type among the at least one third type of ink is not overlapped in absorbing light spectrum;
wherein a wavelength of the first type of ink is not overlapped with any type among the second type of ink and the at least one third type of ink in absorbing light spectrum.

18. The method of claim 17 wherein the plurality of preserved coordinate dots for indicating the boundaries of the data block is not marked with any type of ink, or is marked with a fourth type of ink, for indicating locality of the data block; wherein a wavelength domain of the fourth type of ink is not overlapped with any type among the first type, the second type, and the at least one third type of ink in absorbing light spectrum.

19. The method of claim 1 wherein a scanning device is utilized for radiating a first type and a second type of light; wherein the first type of light corresponds to a wavelength domain of the first type of ink in absorbing light spectrum, and the second type of light corresponds to a wavelength domain of the second type of ink in absorbing light spectrum; wherein the scanning device comprises:
- a first light emitting diode for radiating the first type of light;
- a second light emitting diode for radiating the second type of light;
- a first filter corresponding to the first type of light for filtering lights reflected from the pattern displaying medium;
- a second filter corresponding to the second type of light for filtering light reflected from the pattern displaying medium;
- a first sensor for receiving lights filtered by the first filter and for decrypting messages hidden inside the received lights from the first filter; and
- a second sensor for receiving lights filtered by the second filter and for decrypting messages hidden inside the received lights from the second filter.

20. The method of claim 19 wherein the scanning device further comprises:
- a beam splitter for focusing lights reflected from the pattern displaying medium before the reflected lights are filtered by the first filter or the second filter.

21. A data encryption method implemented on a pattern displaying medium with at least two types of ink comprising:
- marking a plurality of coordinate dots on the pattern displaying medium with a first type of ink, the marked plurality of coordinate dots comprising at least one boundary dot and at least one locality dot, the at least one boundary dot defining a boundary region of at least one data block, and the at least one locality dot being located in the boundary region, wherein marking the plurality of coordinate dots on the pattern displaying medium with the first type of ink comprises marking the plurality of coordinate dots with the first type of ink on a two-dimensional surface of the pattern displaying medium by taking part of the plurality of coordinate dots as a header of a data block so as to indicate boundaries or locality of the data block, wherein any one of the taken part of the plurality of coordinate dots is not marked with a related data dot around, and each coordinate, which is other than any one of the taken part of the plurality of coordinate dots, in the data block is marked with a related data dot around;
- encrypting plaintext data into a plurality of data dots; and
- marking the plurality of data dots within the boundary region of the at least one data block on the pattern displaying medium with a second type of ink according to position of a marked coordinate dot of the plurality of marked coordinate dots, the plurality of data dots forming a data region within the boundary region, coordinate dots being located within the data region having associated data dots;
- wherein a wavelength domain of the first type of ink is not overlapped with a wavelength domain of the second type of ink in absorbing light spectrum,
- wherein the first type of ink absorbs a first invisible light, the second type of ink absorbs a second invisible light, the first invisible light is different from the second invisible light, when the pattern displaying medium is illuminated by the first invisible light, the first invisible light is reflected from the pattern displaying medium, the first invisible light is sensed by a first invisible light image sensor, and the coordinate dots absorbing the first invisible light are sensed by the first invisible light image sensor, and when the pattern displaying medium is illuminated by the second invisible light, the second invisible light is reflected from the pattern displaying medium, the second invisible light is sensed by a second invisible light image sensor, and the data dots absorbing the second invisible light are sensed by the second invisible light image sensor.

22. The method of claim 21, wherein the at least one boundary dot defines a boundary region of a plurality of data blocks, the plurality of data blocks being arranged in an array or interlaced pattern.

* * * * *